Inventors:
Archibald Graham Forsyth,
George James Smith-Pert,

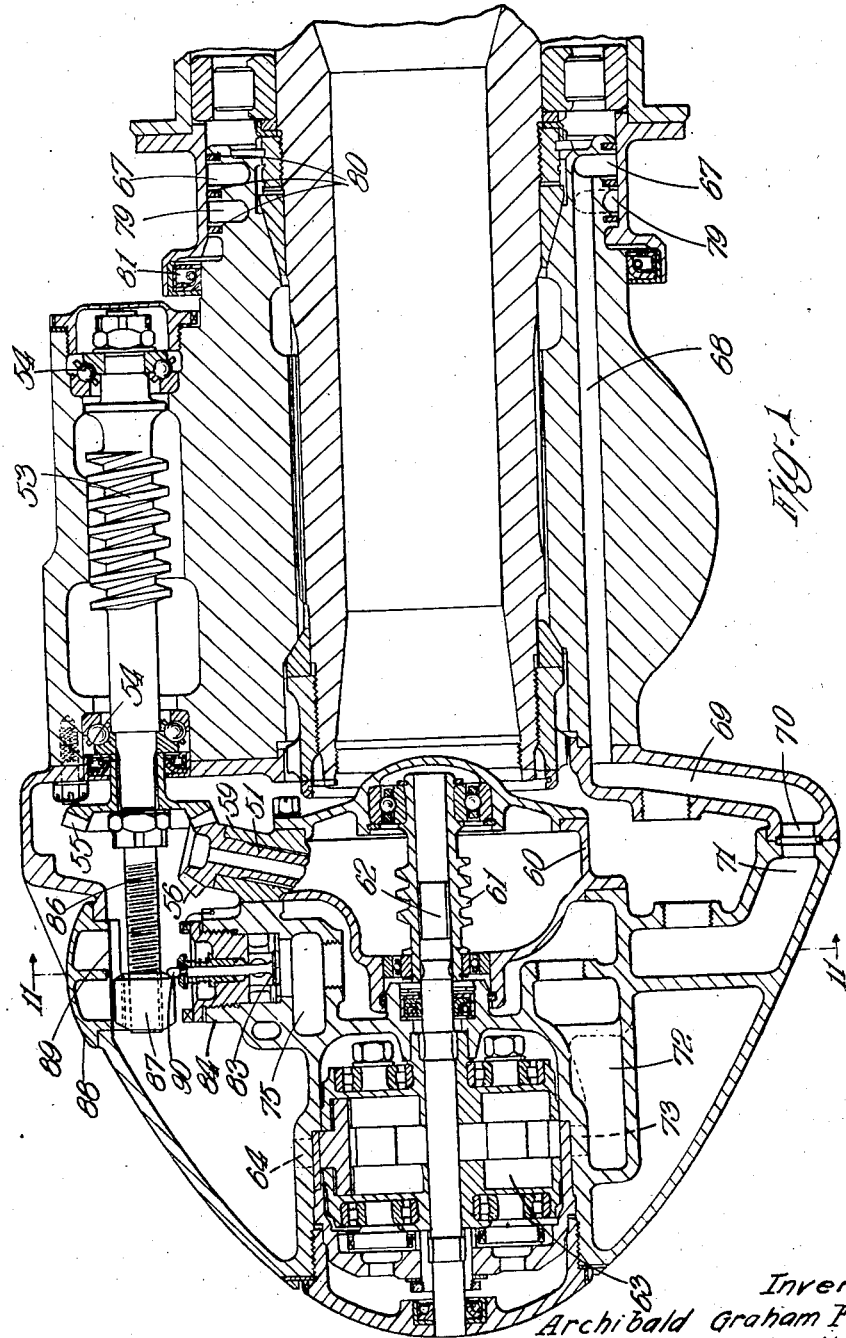

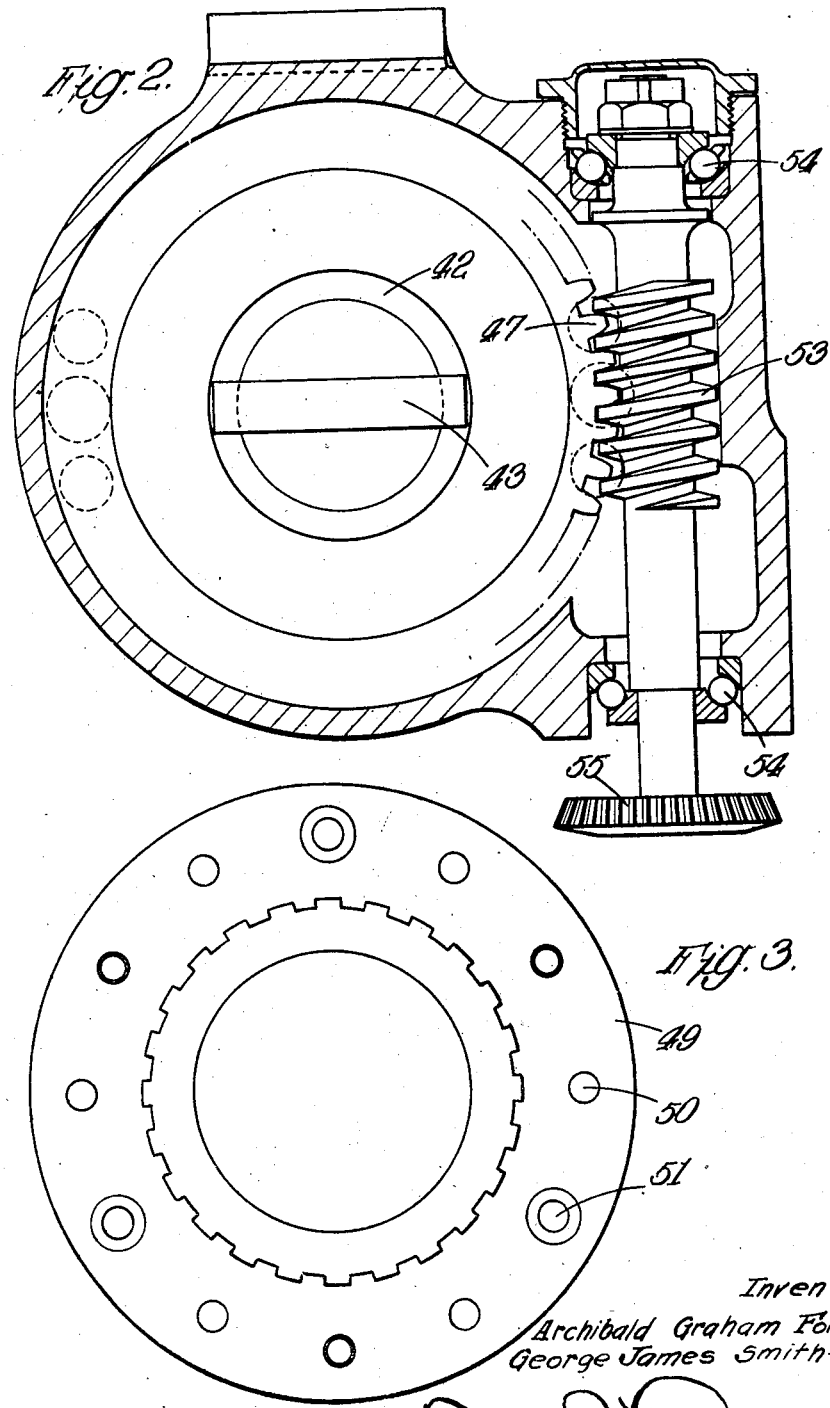

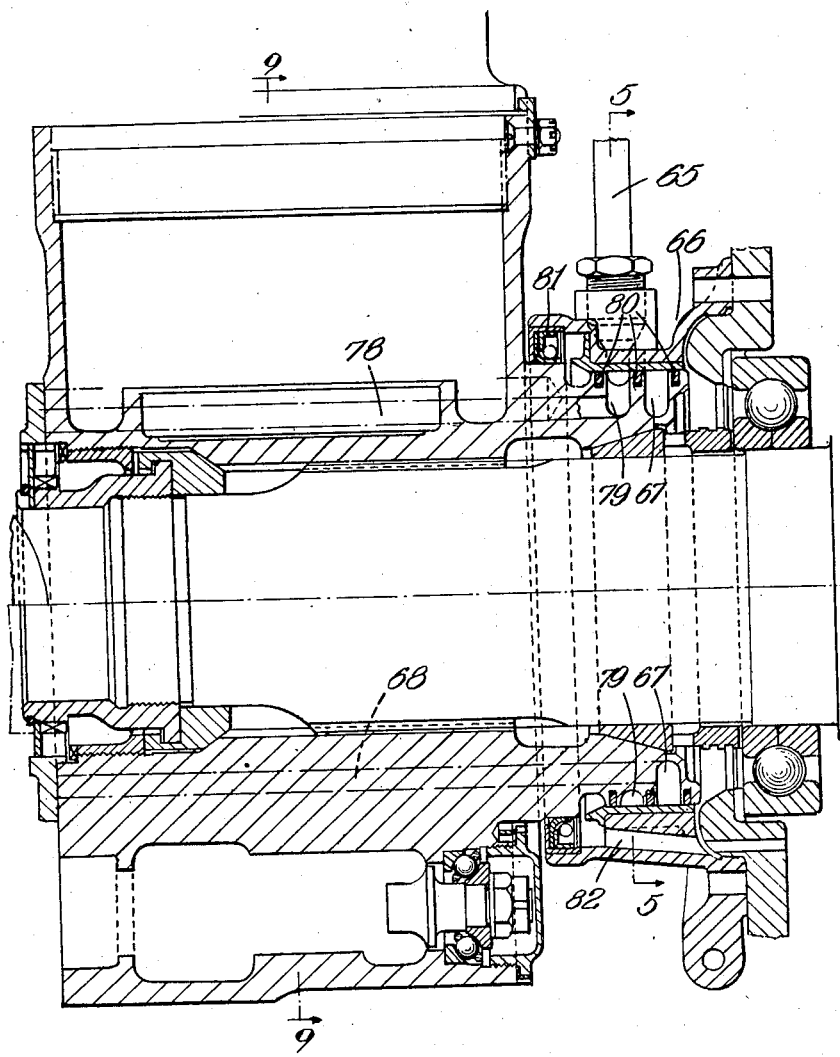

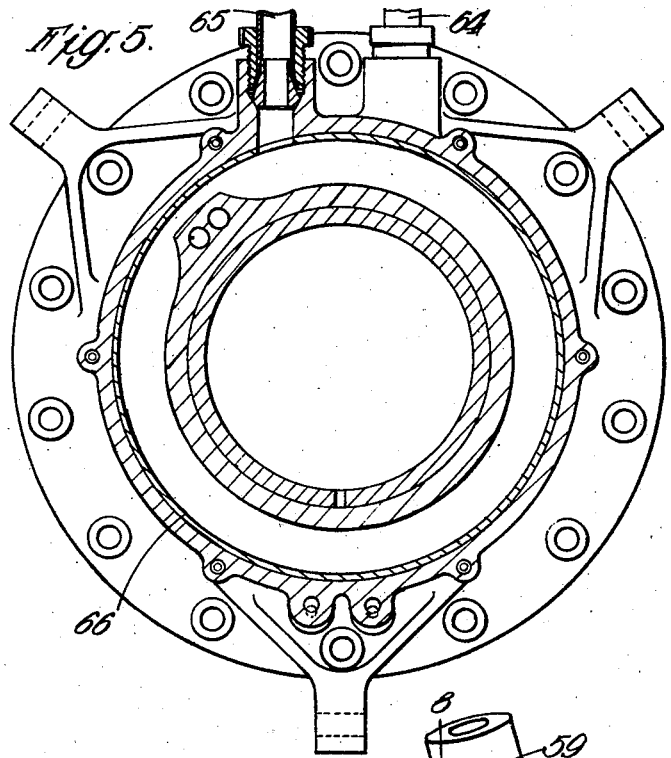
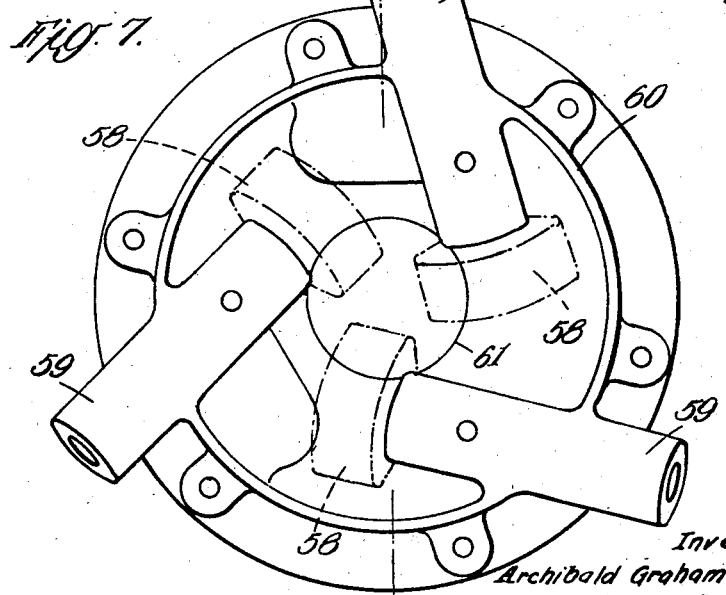

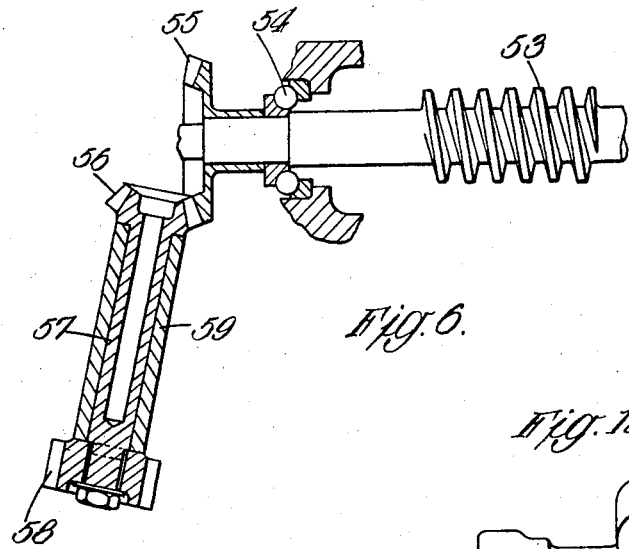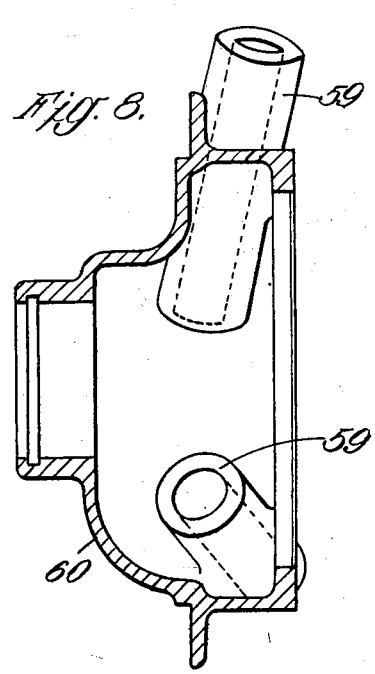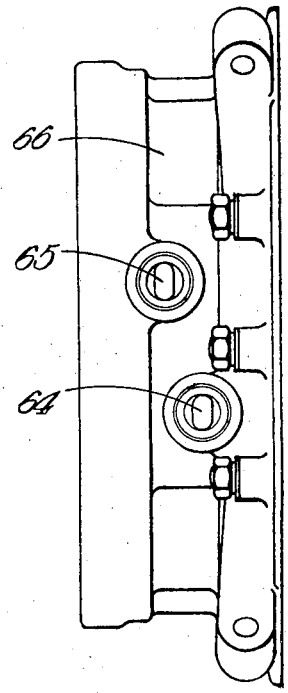

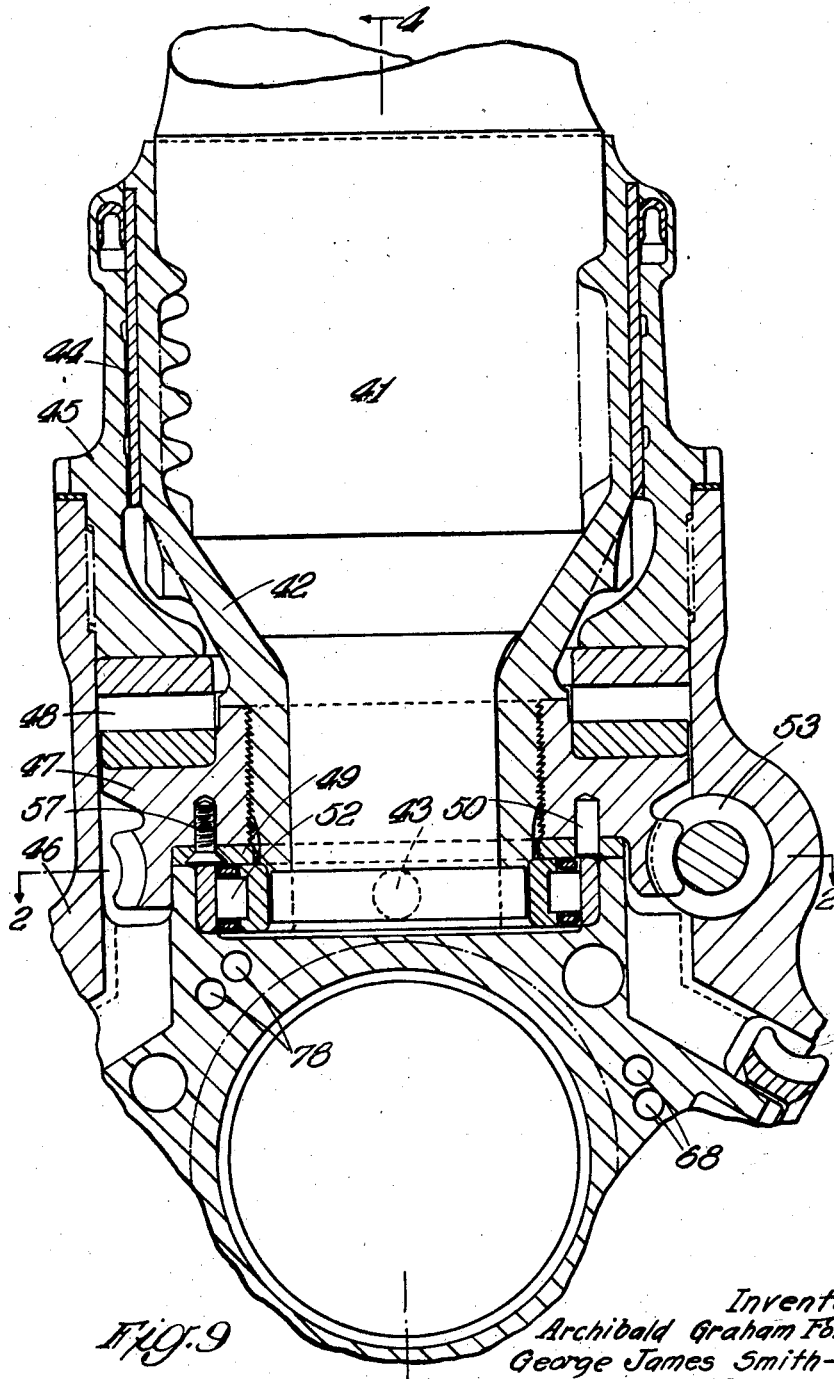

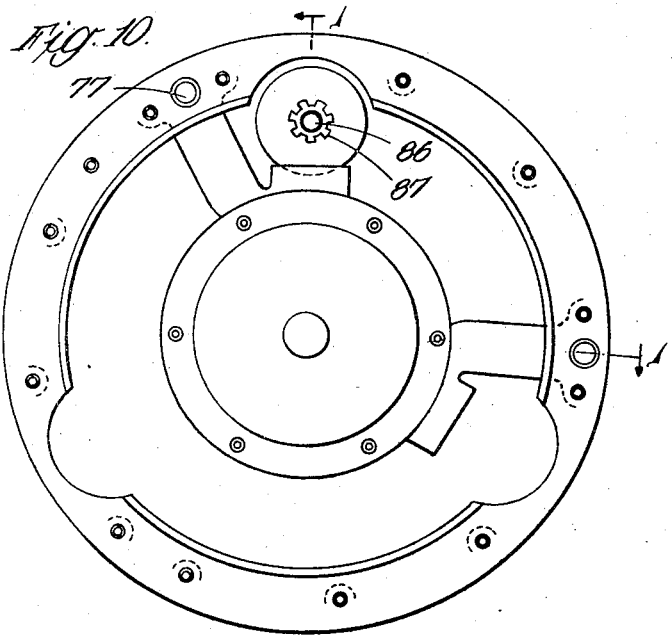
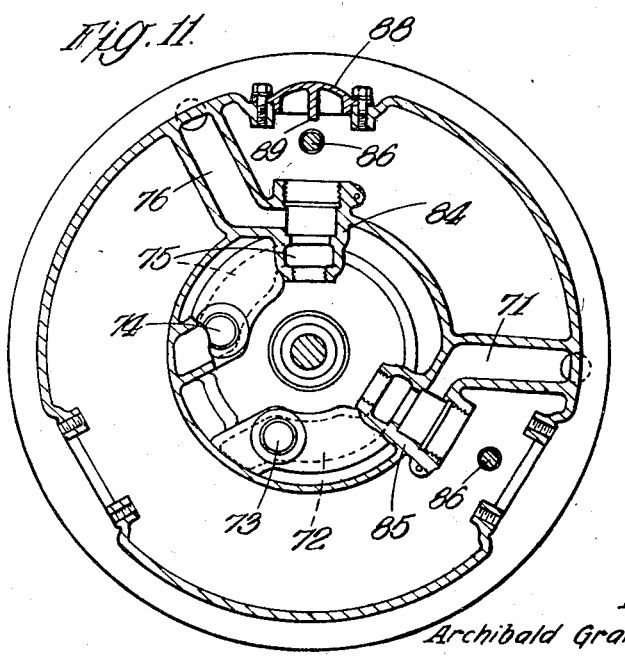

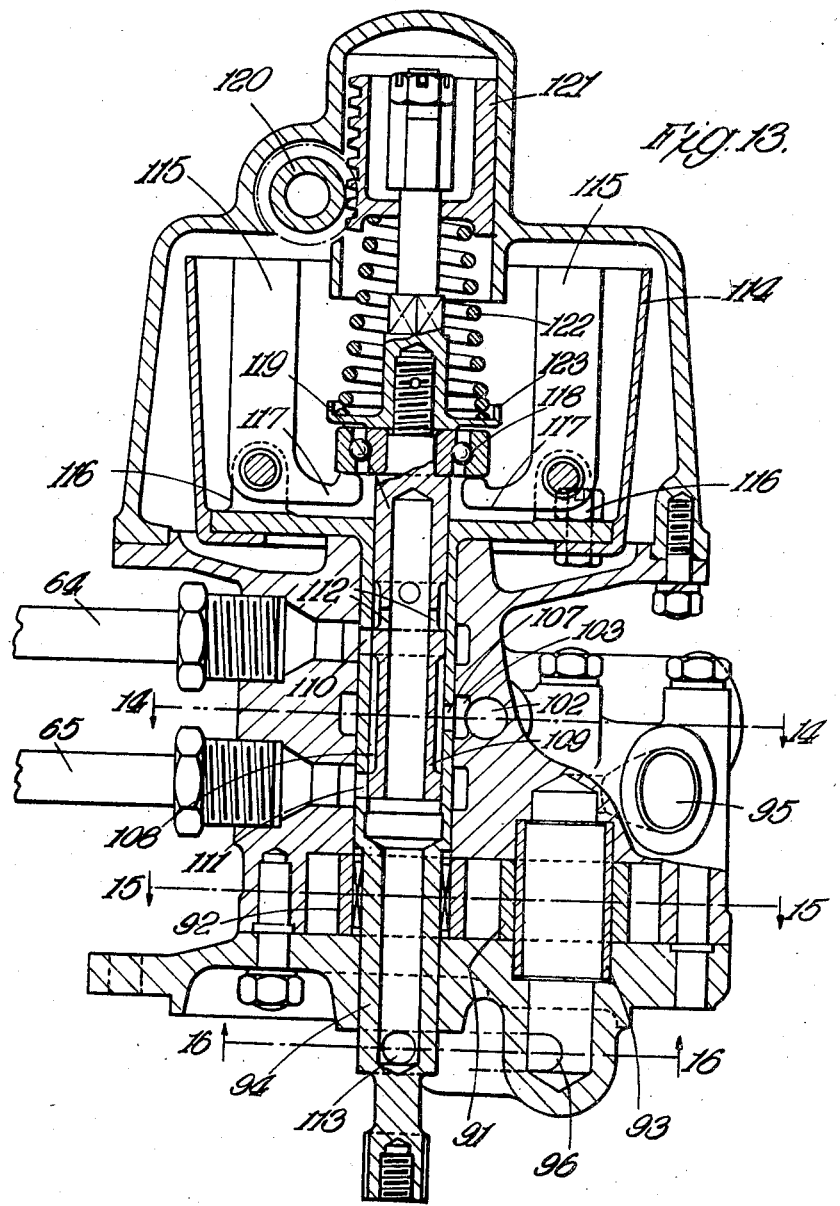

Attorneys

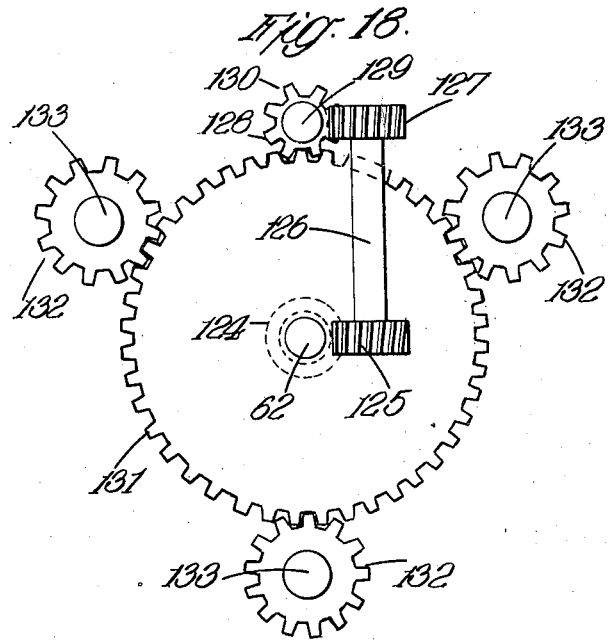
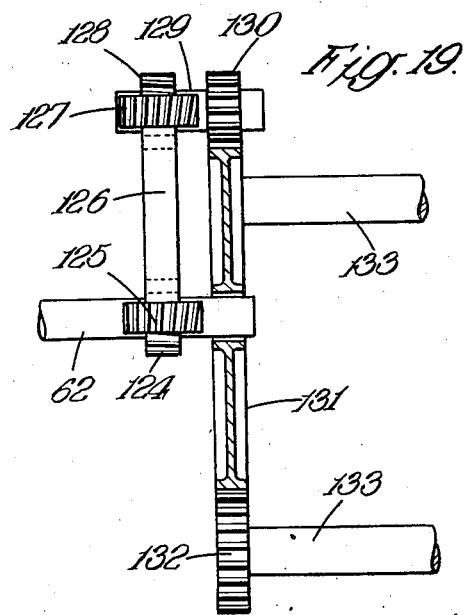

Patented June 13, 1939

2,161,917

UNITED STATES PATENT OFFICE 2,161,917

MEANS FOR VARYING THE PITCH OF PROPELLER BLADES, ESPECIALLY AIRCRAFT PROPELLER BLADES

Archibald Graham Forsyth and George James Smith-Pert, Cheam, England, assignors to The Fairey Aviation Company Limited, Hayes, Middlesex, England Application November 24, 1937, Serial No. 176,372
In Great Britain May 24, 1937

3 Claims. (Cl. 170—163)

This invention relates to means for varying the pitch of propeller blades, and especially of aircraft propeller blades, and has for its object to provide lighter and smaller mechanism for this purpose than has usually been employed in the past.

To this end and in accordance with the present invention, a variable pitch propeller has blades with means for turning them through 360°. Preferably the pitch of the propeller blades is varied by a reversible fluid-operated motor of the continuously rotatable type. Preferably also, oil is supplied to the motor, by a pump driven from, for example, an aircraft engine, and it may be supplied through a two-way valve controlled by a governor driven by said engine, the arrangement being such that admission of oil through one way of the two-way valve drives the fluid operated motor in the one direction and admission of oil through the other way of the two-way valve drives the motor in the other direction. In some cases, however, the two-way valve may be controlled manually, e. g., by the pilot of an aircraft. If desired means may be employed for imposing maximum and minimum pitch values and those means may be such that these values may be adjusted. When the invention is applied to aircraft propellers, the fluid operated motor may be mounted in front of the hub of the propeller in which case the oil conduits for the motor may be accommodated within the propeller shaft.

Figure 14:
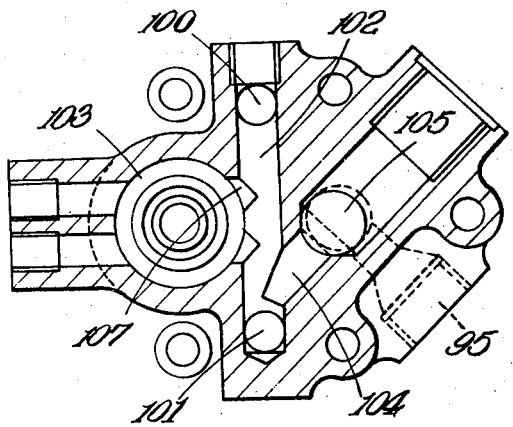
Figure 15:
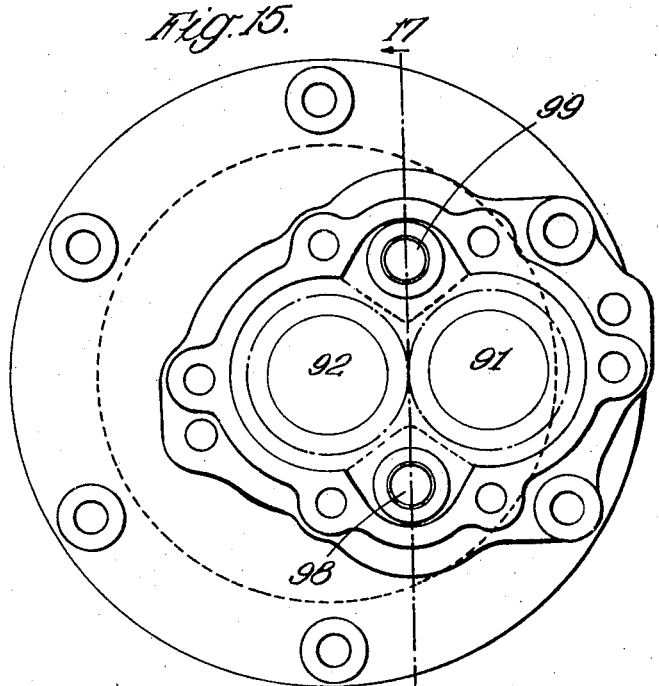
Figure 16:
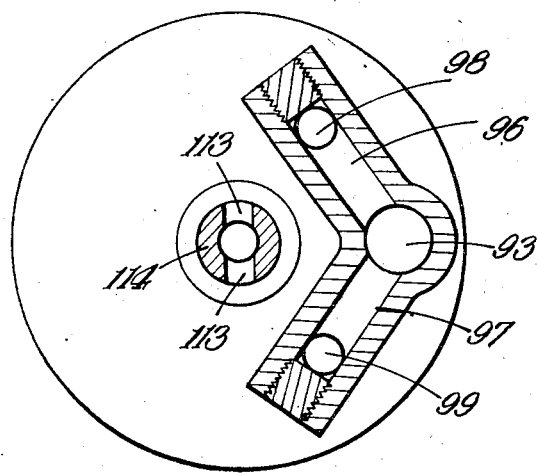
Figure 17:
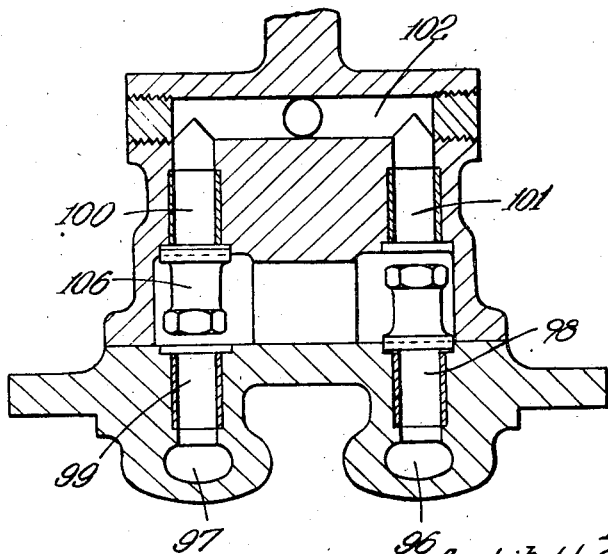

The invention is illustrated by the accompanying drawings wherein Figure 1 is a longitudinal section of the nose of the propeller hub taken on the line I—I, Figure 10, parts being broken away or omitted for the sake of clearness; Figure 2 is a cross-section on the line 2—2, Figure 9; Figure 3 is a face view of a detail; Figure 4 is a section on the line 4—4, Figure 9; Figure 5 is a section on the line 5—5, Figure 4; Figure 6 is a sectional view of a detail; Figure 7 is a diagrammatic end view of a detail fitting which provides shaft bearings; Figure 8 is a section on the line 8—8, Figure 7; Figure 9 is a sectional front view of part of the hub portion of a variable pitch propeller arranged in accordance with one form of this invention, the section being taken on the line 9—9, Fig. 4; Figure 10 is a front view thereof with the nose proper removed; Figure 11 is a sectional front view on the line II—II, Figure 1, parts being omitted from Figures 10 and 11 for the sake of clearness; Figure 12 is a fragmentary plan view; Figure 13 is a longitudinal section of a unit for controlling the flow of oil under pressure to the fluid operated motor; Figures 14, 15 and 16 are sections on the lines 14—14, 15—15 and 16—16, respectively, of Figure 13; Figure 17 is a section on the line 17, 17, Figure 15; Figure 18 is a diagram, as viewed in the axial direction, of modified gear for transmitting power from the fluid operated motor to the propeller blades and Figure 19 is a sectional side view thereof.

As shown in Figure 9, the root 41 of each blade is screwed into a socket 42 and locked by a pin 43. The outer end of the socket 42 is surrounded by a bush 44 revoluble in a socket 45 screwed into the hub body 46, a worm wheel 47 is screwed on to the inner end of said socket 42 and a roller or ball race 48 is interposed between the inner end of the socket 45 and the worm wheel 47 to take the centrifugal loading from the blade root 41, through the socket 42, the worm wheel 47, the roller race 48 and socket 45 back to the hub body 46. The worm wheel 47 is locked to the socket 42 by means of a plate 49 (Figure 3) splined on the inner end of the socket 42 and connected with the worm wheel 47 by dowel-pins 50 and screws 51. 52 is a second bearing to take the rotational movement of the blade root 41.

Meshing with the worm wheel 47 is a worm 53 carried in the hub body 46 by thrust bearings 54, 54 (Fig. 2) which take the end thrust in both directions and thus definitely locate said worm 53; hence the worm drive to the blade is irreversible, that is to say although it can be operated to turn a blade in either direction forces acting on the blade cannot drive the worm 53. 55 is a bevel wheel on the shaft of the worm 53 and the bevel wheels 55 appertaining to the several blades of the propeller mesh with bevel wheels such as 56 carried by shafts, such as 57, Figure 6, having at their opposite ends skew gear wheels, such as 58 mounted to rotate in sleeves 59. As indicated in Figures 7 and 8 the sleeves 59 form part of a fitting 60 and are disposed so that the axes of the shafts such as 57 are substantially convergent and so that the skew gear wheels 58 may mesh with a common worm 61 splined on the shaft 62 of the fluid-operated motor indicated generally at 63, Figure 1. The fluid-operated motor 63 may be of any suitable reversible type such as the continuously rotatable fluid operated reversible motor herein diagrammatically illustrated, hence rotation thereof in either direction will drive the worm 61, skew gear wheels 58, shafts 57, bevel wheels 56, 55, worms 53, and worm wheels 47 to rotate the propeller blades in either direction and said blades will be locked in their adjusted positions when the motor 63 is stopped; further the mechanism provided is adapted to rotate said blades through 360°.

Oil under pressure is supplied to the motor 63 from the oil supply of the aircraft engine (or from a constant speed unit to be mentioned hereinafter) by way of pipes 64 and 65, Figures 4, 5 and 12 which, by means of a two way cock may be caused to serve either as inlet or exhaust pipes, respectively, or conversely. The pipes 64 and 65 are connected with the housing 66 which is arranged to be fixed on the forward end of the crankcase of the aircraft engine and as shown in Figure 12 they do not lie on the same transverse plane. Assuming 64 to be the oil inlet pipe for the time being, oil passes therefrom to a groove 67 in the housing 66, along a twin passage 68 to a passage 69 (Figure 1) and thence through an aperture 70, Figures 1 and 11, to passages 71 and 72 to a port 73 to the motor 63. The exhaust from the motor 63 is by way of a port 74 (Figures 1 and 11), through passages 75 and 76, an aperture 77, Figure 10, corresponding with the aperture 70, a twin passage 78, Figure 4, corresponding with the passage 68 and a groove 79 in the housing 66 to the pipe 65 and thence back to the engine sump or the oil tank. The true positions of the passages 68 and 78 are shown in Figure 9. Oil leakage from the grooves 67 and 79 is controlled by three piston rings 80, Figures 4 and 1, and an oil seal 81 is provided to prevent oil from leaking to the outside of the housing 66, whilst drains, such as 82, are provided to carry excess oil back into the engine crank case.

Although the mechanism of this invention, as thus far described, is adapted to turn the propeller blades through 360°, it is desirable, in some circumstances to arrange that the pitch of said blades shall have predetermined maximum and minimum values, i. e., that the blades cannot be set at more than a predetermined pitch or at less than a predetermined pitch, but can be set at any intermediate pitch. To enable this to be done the pipe and passage connections between the pipes 64 and 65 include two valves such as 83 Figure 1, the angular situations of which are indicated by the valve housings 84 and 85 in Figure 11. The spindles of the worms 53 at these angular situations have screw threaded extensions, as shown at 86, Figure 1, and on each extension 86 is a nut 87, the periphery of which is serrated as shown in Figure 10. A cover 88, closing an aperture in the adjacent part of the nose of the propeller, is furnished with a key or feather 89 which is received between two adjacent teeth of the nut 87, thus preventing it from turning. Hence when the worms 53 are revolved, the nuts, such as 87, on their extensions such as 86, are caused to travel along said extensions. It will be observed, Figure 10, that the serrations are such that when a space between two teeth of a nut 87 is at the top, the end of a tooth is at the bottom, of the vertical centre line. Each valve, such as 83, has a stem, such as 90, Figure 1, projecting radially outwards to such an extent that its free end overlaps the teeth of the nut 87 when the valve is on its seating; Figure 1 shows the position of the parts when the valve 83 has just closed, the motor 63 has stopped through lack of circulation of oil, and revolution of the worms 53 has ceased, i. e., the propeller blades have been set to a predetermined limit pitch value, in this instance the minimum value. If now oil under pressure be admitted through the pipe 65 the valve 83 shown in Figure 1 will be blown off its seat, oil will circulate through the motor 63 and the worms 53 will be rotated. The nut 87 shown in Figure 1 will then be able to pass over the end of the stem 90 of the valve 83 as said valve has been blown off its seating by the oil pressure, whilst the other valve will be held off its seating by the contact of the end of its stem 90 with a tooth on the corresponding nut 87, until, when the pitch of the propeller blades has been varied to such an extent that the maximum pitch value has been attained, said nut will have been caused to travel along its appertaining threaded spindle extension 86 to such an extent that the end of the valve stem 90 will become disengaged from a tooth of said nut and the valve, which, for the time being is the outlet valve, will close, its stem 90 rising on the outside of the nut 87, and once again lack of oil circulation will cause the motor 63 to stop and the variation of pitch to cease.

By removing the covers 88 access may be had to the nuts 87 and by turning said nuts and replacing the covers 88 with their keys 89 engaged between different teeth, the maximum and minimum pitch values which the propeller blades are to be allowed to attain may be varied. Actually, an angular adjustment of a nut 87 corresponding with one tooth will alter the predetermined pitch value by approximately 30'; this can be controlled by arranging suitable screw threads and serrated nuts to give any desired setting.

Figures 13, 14, 15, 16 and 17 illustrate a unit for controlling the flow of oil to the fluid operated motor 63. This device comprises a pump constituted by interengaging gear wheels 91, 92, the gear wheel 91 being mounted on a hollow spindle 93 and the gear wheel 92 being mounted on a hollow spindle 94, which extends upwardly through the unit. Oil is admitted to the unit through a passage 95 and passes down through the hollow spindle 93 to twin passages 96, 97 (Figure 16) which communicate with twin pump inlet ports 98, 99 (best seen in Figure 17). Twin pump outlet ports 100, 101 communicate on the one hand, by a passage 102 with an annular groove 103 (Figures 13 and 14) formed around the spindle 94, and, on the other hand, by a passage 104 through a relief valve 105 (Figure 14) with an oil outlet to the sump.

As shown, the inlet port 98 and the outlet port 100 are closed by plugs 106, 106, but if desired, these ports may be left open and the inlet port 99 and the outlet port 101 may be closed instead by plugs 106, 106. In this way, the pump may be arranged to deliver oil to the passage 102 irrespective of the sense of rotation of said pump. The annular groove 103 communicates by apertures such as 107 in the spindle 94, with an annular space 108 between a double piston valve 109 and said spindle 94. Said piston valve 109 is slidable axially of the spindle 94 under centrifugal control (as will be explained hereinafter) and, in its mid position it closes two ports 110, 111 through which oil may be admitted to the pipes 64, 65 respectively leading to the fluid operated motor 63. Apertures such as 112 are formed in the upper part of the piston valve 109 and the hollow spindle 94 communicates at its lower end with the sump by apertures such as 113 (Figure 13) for a purpose to be explained hereinafter.

*Operation*

The spindle 94 terminates in a cup shaped member 114 in which a pair of balance weights 115, 115, are pivotally mounted on lugs 116, 116. Noses 117, 117 of the balance weights 115, 115, bear on the underside of a ball race 118 mounted on an extension 119 of the piston valve 109.

The spindle 94 is arranged to be driven from the aircraft engine through splines formed on the lower end thereof. A spring 122 is located between a collar 123, secured to the extension 119 of the valve 109, and a member 121 which is slidably mounted upon a rod carried by the collar 123. The member 121 is formed with rack teeth which mesh with a pinion 120 which pinion may be rotated in one direction or the other by a control in the cockpit of the aircraft so as to cause axial movement of the member 121 and consequent variation of the pressure exerted by the spring 122.

In operation, oil enters the unit (from the ordinary oil pressure system of the engine) by the passage 95 and passes down the hollow spindle 93, through the passage 97 to the pump inlet 99. The pump, rotated by the hollow spindle 94 (which is rotated by the aircraft engine through splines at its lower end as described above) delivers oil through the outlet 101 to the passage 102 whence it passes to the annular space 103 and thence through the apertures 107 to the annular space 108 surrounding the piston valve 109. If now the engine speed is such that the piston valve closes the ports 110 and 111, the oil pressure built up in the passage 102 will open the relief valve 105 and allow the oil to flow back to the sump. Suppose, however, the engine speed is such that the piston valve 109 is lifted by the governor balance weights 115, 115 to open the ports 110 and 111. Oil under pressure will now flow from the annular space 108 through the port 110 to the pipe 64 which leads to the fluid operated motor 63 through valve 83 so long as said valve is kept open by the nut 84 (see Fig. 9), and said motor will be rotated to turn gears 56 and 55 and worm 53 to increase the pitch of the blades. Oil from the motor returns by the pipe 65 (Figs. 4, 12 and 13), passes through the port 111 into the hollow spindle 94 and drains away to the sump through the apertures 113.

If, on the other hand, the engine speed falls, and the piston valve 109 is lowered past the mid position in which the ports 110, 111 are closed, said ports will be opened and oil under pressure will flow from the annular space 108 through the port 111 to the pipe 65 leading to the fluid operated motor 63. The motor 63 will then be rotated to decrease the pitch of the blades. Oil returns by the pipe 64 and passes through the port 110 and apertures 112 to the inside of the piston valve 109 whence it flows down the hollow spindle 94 and returns to the sump through the apertures 113.

As shown in Figures 18 and 19, the shaft 62 of the fluid operated motor 63 carries a skew gear wheel 124 meshing with a corresponding skew gear wheel 125 on a shaft 126 on the other end of which is a skew gear wheel 127 driving a skew gear wheel 128 on a shaft 129 on which is a pinion 130 meshing with a gear wheel 131 with which also mesh pinions such as 132 on shafts such as 133 on which the worms 53 are mounted.

The arrangement in accordance with this invention is such that by hydraulically operated means the pitch of the propeller blades can be varied and if desired they may be "feathered," i. e., set substantially in a fore and aft plane so that they present the minimum resistance if the propeller is not revolving.

The unit as a whole is adapted for use with different types or powers of engines and may be arranged so as to be interchangeable.

We claim:

1. A variable pitch propeller comprising a hub, a reversible fluid operated motor mounted on said hub, propeller blades having roots rotatable in said hub, means including shafts driven by said motor in opposite directions for rotating said blade roots, a fluid system conveying oil to and from said motor, said system including an oil pump driven by the aircraft engine and including a manually adjustable valve responsive to engine speed for regulating the pump outlet within predetermined manually adjusted limits and a pair of valves controlling the flow of oil to and from the motor for rotating said motor in opposite directions, screw threaded extensions on two of said shafts and nuts on said extensions for acting on said valves, keys fixed relatively to said nuts, each of said nuts being formed with an odd number of teeth between any two of which one of said keys may be engaged, that tooth which is diametrically opposite to the key being adapted to cooperate with the stem of one of said valves.

2. A variable pitch propeller comprising a hub, a reversible fluid operated motor mounted on said hub, propeller blades having roots rotatable in said hub, shafts driven by said motor in opposite directions for rotating said blade roots, a fluid system conveying oil to and from said motor, said system including oil pump means driven by the aircraft engine for supplying oil to said fluid operated motor and including a manually adjustable valve responsive to engine speed for regulating the pump output within predetermined manually adjusted limits and a pair of valves controlling the flow of supplied oil to and from said motor for rotating said motor in opposite directions, screw threaded extensions on two of said shafts, and nuts on said extensions for acting on said valves, removable keys fixed relatively to said nuts, each of said nuts being formed with an odd number of teeth between any two of which one of said keys may be engaged, that tooth which is diametrically opposite to the key being adapted to cooperate with the stem of one of said valves.

3. A variable pitch propeller as claimed in claim 2 wherein each key forms part of a removable cover.

ARCHIBALD GRAHAM FORSYTH.
GEORGE JAMES SMITH-PERT.